(12) United States Patent
Garegrat et al.

(10) Patent No.: US 11,169,776 B2
(45) Date of Patent: Nov. 9, 2021

(54) DECOMPOSED FLOATING POINT MULTIPLICATION

(71) Applicant: Intel Corporation, Santa Clara, CA (US)

(72) Inventors: Nitin N. Garegrat, San Jose, CA (US); Maciej Urbanski, Gdansk (PL); Michael Rotzin, Santa Clara, CA (US); Brian J. Hickmann, Sherwood, OR (US); Valentina Popescu, La Jolla, CA (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 16/457,318

(22) Filed: Jun. 28, 2019

(65) Prior Publication Data

US 2019/0324723 A1 Oct. 24, 2019

(51) Int. Cl.
*G06F 7/487* (2006.01)
*G06F 7/523* (2006.01)
*G06F 7/544* (2006.01)
*G06F 17/16* (2006.01)

(52) U.S. Cl.
CPC ............ *G06F 7/4876* (2013.01); *G06F 7/523* (2013.01); *G06F 7/5443* (2013.01); *G06F 17/16* (2013.01); *G06F 2207/3816* (2013.01)

(58) Field of Classification Search
CPC ...... G06F 7/4876; G06F 7/5443; G06F 7/523; G06F 17/16; G06F 2207/3816; G06F 2207/382; G06N 3/04; G06N 3/0454; G06N 3/063
See application file for complete search history.

(56) References Cited

U.S. PATENT DOCUMENTS

| 8,706,790 B1 * | 4/2014 | Langhammer ........ G06F 7/4876 708/513 |
| 10,167,800 B1 | 1/2019 | Chung et al. |
| 2013/0007075 A1 * | 1/2013 | Oliver ..................... G06F 7/483 708/203 |

(Continued)

OTHER PUBLICATIONS

Programmable Logic Devices, Ch 4, http://www.csun.edu/edaasic/roosta/ECE595_Chap4.pdf, 2018 (Year: 2018).*

(Continued)

*Primary Examiner* — Emily E Larocque
(74) *Attorney, Agent, or Firm* — Jordan IP Law, LLC

(57) ABSTRACT

Systems, apparatuses and methods may provide for technology that in response to an identification that one or more hardware units are to execute on a first type of data format, decomposes a first original floating point number to a plurality of first segmented floating point numbers that are to be equivalent to the first original floating point number. The technology may further in response to the identification, decompose a second original floating point number to a plurality of second segmented floating point numbers that are to be equivalent to the second original floating point number. The technology may further execute a multiplication operation on the first and second segmented floating point numbers to multiply the first segmented floating point numbers with the second segmented floating point numbers.

21 Claims, 10 Drawing Sheets

(56) References Cited

U.S. PATENT DOCUMENTS

2019/0042244 A1    2/2019  Henry et al.
2019/0325301 A1*  10/2019  Wang .................... G06F 7/5443
2020/0201642 A1*   6/2020  Dupont de Dinechin ..................
                                                    G06F 9/30145

OTHER PUBLICATIONS

Brian Hickmann et al., "Apparatuses and Methods to Accelerate Matrix Multiplication", International Patent Application No. PCT/PL2018/000091, filed Sep. 27, 2018, 139 pages.
Office Action for Indian Patent Office Application No. 202044010107, dated Jul. 29, 2021, 8 pages.

* cited by examiner

Operation One 320

$LA_{00} \times LB_{00} = PP_{00}$ $MA_{00} \times LB_{00} + PP_{00} = PP_{00}$ $\vdots$ $HA_{00} \times HB_{00} + PP_{00} = PP_{00}$

Operation Two 322

$LA_{01} \times LB_{10} + PP_{00} = PP_{00}$ $MA_{01} \times LB_{10} + PP_{00} = PP_{00}$ $\vdots$ $HA_{01} \times HB_{10} + PP_{00} = PP_{00}$

Operation N 324

$LA_{0N} \times LB_{N0} + PP_{00} = PP_{00}$ $MA_{0N} \times LB_{N0} + PP_{00} = PP_{00}$ $\vdots$ $HA_{0N} \times HB_{N0} + PP_{00} = C$

FIG. 3B

Operation One
*330*

$LA_{00}$ X $LB_{00}$ = AP $MA_{00}$ X $LB_{00}$ + AP = AP

⋮

$HA_{00}$ X $HB_{00}$ + AP = AP

AP = MP

0 = AP

⋮

Operation Two
*332*

$LA_{01}$ X $LB_{10}$ + AP = AP $MA_{01}$ X $LB_{10}$ + AP = AP

⋮

$HA_{01}$ X $HB_{10}$ + AP = AP

MP + AP = MP

0 = AP

⋮

Operation N
*334*

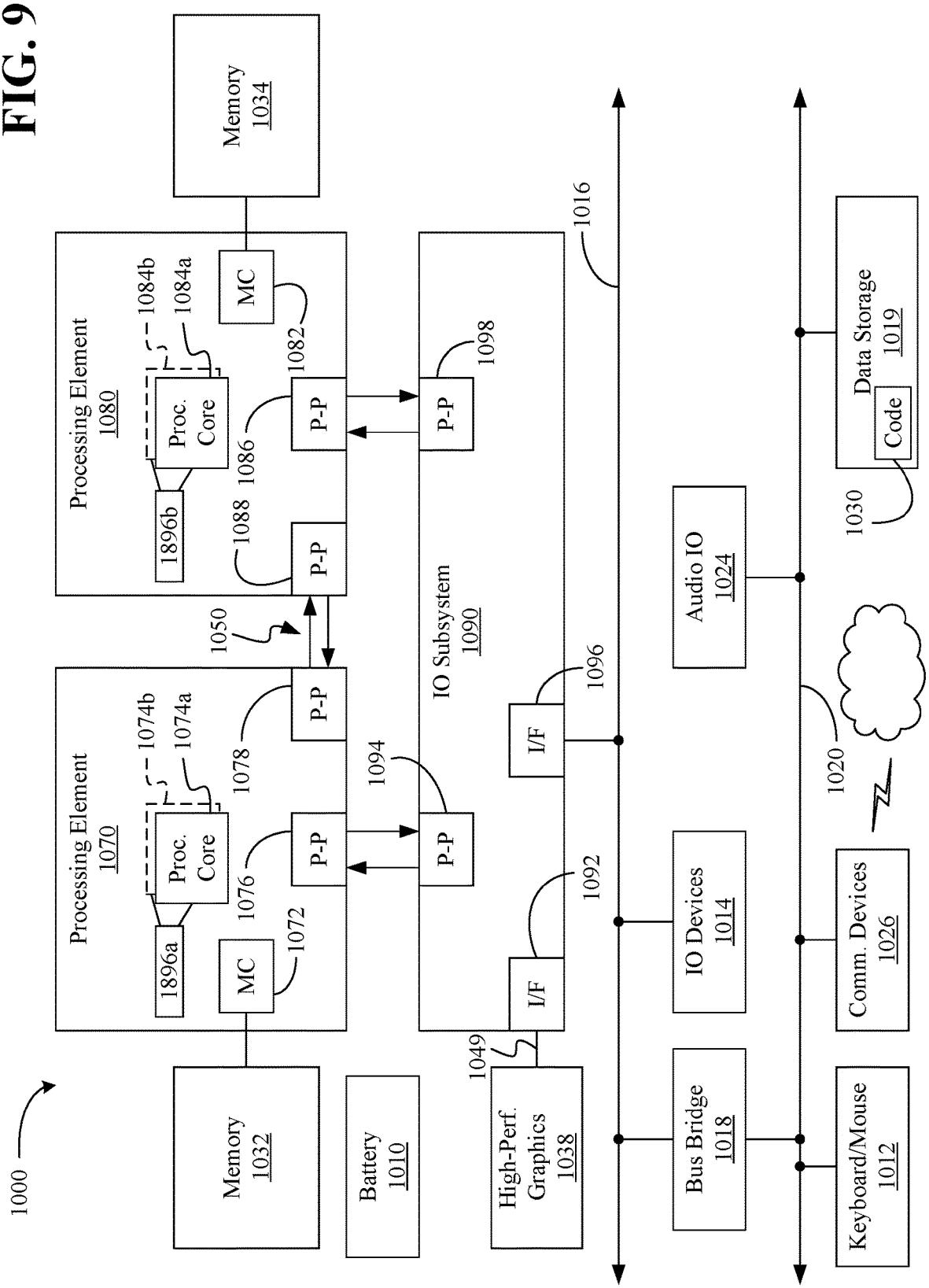

DECOMPOSED FLOATING POINT MULTIPLICATION

TECHNICAL FIELD

Embodiments generally relate to operations related to multiplication technology. More particularly, embodiments relate to decomposing floating point numbers to execute multiplication (e.g., matrix multiplication) on existing hardware.

BACKGROUND

Many compute cycles in certain workloads (e.g., deep learning workload and/or neural network learning) may be spent performing matrix multiplications that consume data in some input type and produce a result in a possibly different output type. For example, deep learning workload and/or neural network learning may execute matrix multiplication to determine weights.

Because of area constraints, some hardware multiplication units may consume only a first type of data (e.g., brain floating point 16 format) as an input, while producing an output that is either the first type of data or a second type of data (e.g., float 32 format). The second type of data may be more precise than the first type of data. In some cases, the input is insufficient to generate a useful output due to the lower precision of the first type of data. To increase precision, the matrix multiplication may need to be adjusted to consume the second type of data as an input instead of the first type of data.

BRIEF DESCRIPTION OF THE DRAWINGS

The various advantages of the embodiments will become apparent to one skilled in the art by reading the following specification and appended claims, and by referencing the following drawings, in which:

FIGS. 3A-3C are an example of a process of executing matrix multiplication according to an embodiment;

FIG. 9 is a block diagram of an example of a multi-processor based computing system according to an embodiment.

DESCRIPTION OF EMBODIMENTS

Figure 1:
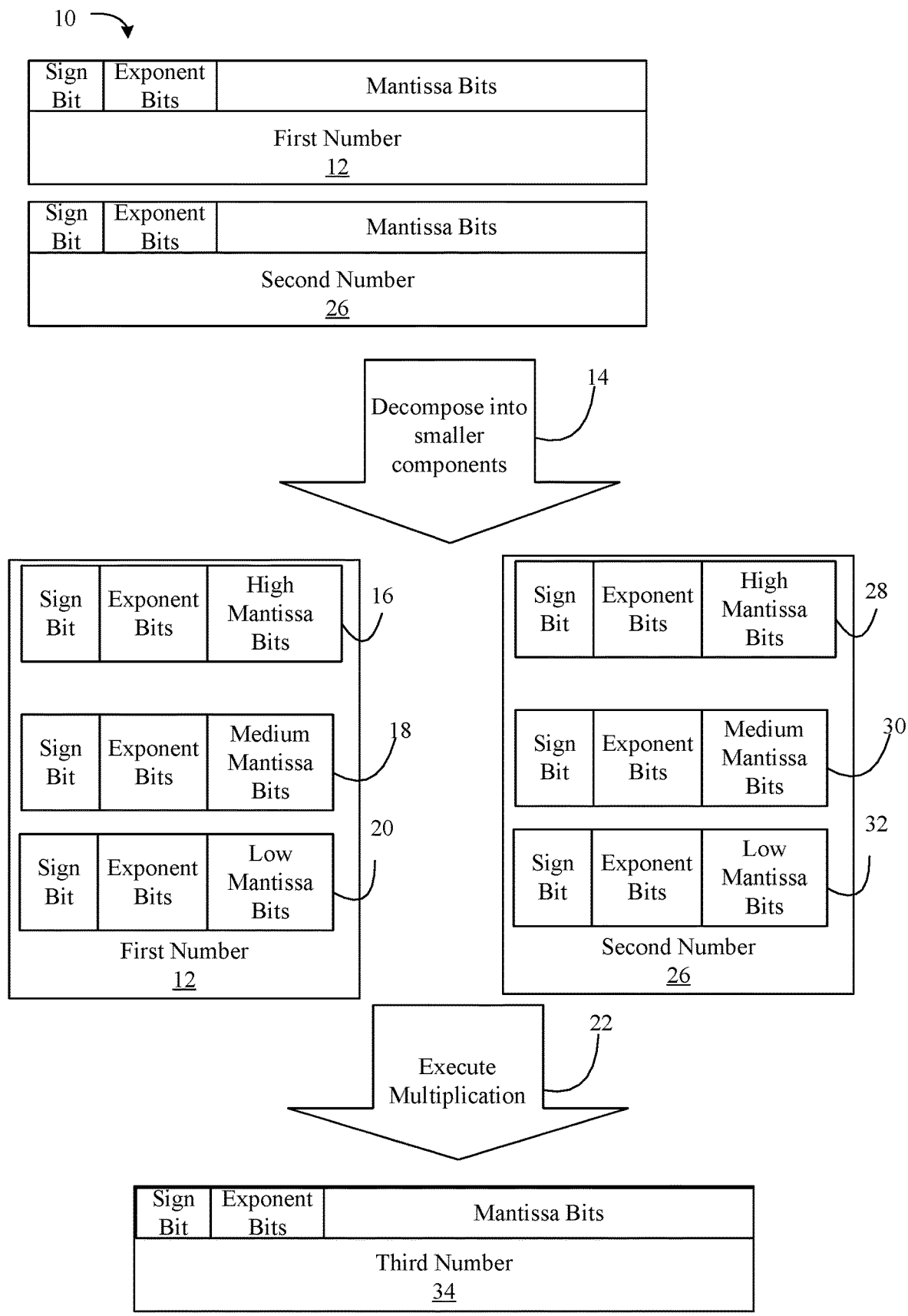
FIG. 1 is an example of a process to decompose numbers to a different data format according to an embodiment.

FIG. 1 illustrates a process 10 to decompose first and second numbers 12, 26 to a different data format to execute multiplication. In detail, process 10 may utilize existing hardware, which executes on a first type of data format, to process first and second numbers 12, 26 that are in a second data format. For example, the first type of data format may be brain floating point 16 (bfloat16) format and the second type of data format may be in a single-precision floating-point format (float32). Process 10 may therefore utilize existing hardware (e.g., a bfloat-only pipeline) to process data (e.g., float32) that would otherwise be incompatible with the existing hardware. As discussed in further detail below, a granularity of the process 10 may also be adjusted to balance performance of the hardware against the accuracy of the output.

In the example of FIG. 1, the first number 12 and the second number 26 may be in the second format. In detail, the first number 12 and the second number 26 may each have a sign bit (e.g., indicates positive or negative), exponent bits (e.g., indicates an exponent and/or a biased exponent) and mantissa bits (e.g., a significand or fraction). A plurality of numbers 16, 18, 20, 28, 30, 32 of the first type of data format may represent the first and second numbers 12, 26. For example, if the first and second numbers 12, 26 are each originally in float32 format, the first and second numbers 12, 26 may each be represented by a sum of three bfloat16 16, 18, 20, 28, 30, 32 components with little to no information loss.

As illustrated, the first and second numbers 12, 26 may be decomposed into smaller components 14. In detail, the first high number 16, the first medium number 18 and the first low number 20 may be in the first type of data format to represent the first number 12.

The first high number 16 may include the most significant mantissa bits of first number 12. For example, the first high number 16 may include an exponent, the sign of the first number 12 and the first N-bits (e.g., the implicit bit and bit positions 22-16 and/or 8 bits total) of the mantissa of the first number 12. The exponent of the high number 16 may be identical to the exponent of the first number 12.

The medium number 18 may include an exponent, a sign associated with next most significant N-bits of the mantissa (e.g., signs may differ due to rounding to nearest mode used during extraction of the 3 bfloat numbers) and the next most significant N-bits of the mantissa (e.g., ranging from bit positions 15-8 and/or 8 bits total) of the mantissa of the first number 12. Thus, in some embodiments the sign of the medium number 18 may be different from the sign of the first number 12 depending on the value in the next most significant N-bits. The exponent of the medium number 18 may be determined from the exponent of the first number 12. For example, the exponent of the first number 12 may be reduced to reflect the lower bit positions of the mantissa of the first number 12 that are to be stored in the medium number 18. The reduced exponent may be stored as the exponent of the medium number 18. For example, the exponent of the first number 12 may be reduced by an amount "X" (e.g., 8) and stored as the exponent of the medium number 18.

The low number 20 may include an exponent, a sign associated with the remainder of the mantissa, and the remainder of the mantissa (e.g., ranging from bit positions 7-0 and/or 8 bits total) of the mantissa of the first number 12. In some embodiments the sign of the low number 20 may be different from the sign of the first number 12 depending on the value in the remainder of the mantissa. The exponent of the low number 20 may be determined from the exponent of the first number 12. For example, the exponent of the first number 12 may be reduced to reflect the lowest bit positions of the mantissa of the first number 12 that are to be stored in the low number 20. The reduced exponent may be stored as the exponent of the first number 12. For example, the exponent of the first number 12 may be reduced by an amount "2X" (e.g., 16) and stored as the exponent of the low number 20. As noted, the exponent of the low number 20 may be smaller than the exponent of the medium number 18, and the exponent of the medium number may be smaller than the exponent of the high number 16.

Likewise, the second high number 28, the second medium number 30 and the second low number 32 may be in the first type of data format to represent the second number 26. The exponent of the second number 26 may also be adjusted as described above to generate the second high number 28, the second medium number 30 and the second low number 32.

In some embodiments, to convert the first number 12 and the second number 26 each into three components that are in the first type of data format, different algorithms may be used. For example, to convert a float32 variable a into three bfloat components the following algorithm may be used to split variable a into high component $a_h$, medium component $a_m$ and low component $a_l$: 1) $a_h$=(bfloat)a; define(t)=a−$a_h$; 2) $a_m$=(bfloat)t; t=t−$a_m$; 3) $a_l$=(bfloat)t. The expected exponents of high, medium and low components $a_h$, $a_m$, and $a_l$ are generated as follows: 1) $a_h$ has the same exponent as a; 2) $a_m$ has an exponent that is at least 8 lower than a; 3) $a_l$ has an exponent that is at least 16 lower than a. A "(bfloat)a" operation may be a cast operation which down-converts from fp32 to bfloat. Thus, in this example, high component $a_h$ contains the sign, the above determined exponent and the most significant 8 bits of the mantissa of the variable a. Medium component $a_m$ stores the sign, the above determined exponent and the next 8 bits of the mantissa of variable a that start after the mantissa bits stored by high component $a_h$. The low component $a_l$ stores the sign, the above determined exponent and the remainder of the mantissa of number a that are not stored by either of high component $a_h$ or medium component $a_m$. In some embodiments, the value of high component $a_h$ alone may be used to approximate the value of variable a. The value of high component $a_h$+medium component $a_m$ may more precisely represent the value of variable a, and value of high component $a_h$+medium component $a_m$+low component $a_l$ is precisely equal to the value of variable a.

Process 10 may then execute a multiplication operation 22. For example, multiplication of the first and second numbers 12, 26 (that may be in the second type of data format) may correspond to multiplications that consumes the first high number 16, the first medium number 18, the first low number 20, the second high number 28, the second medium number 30 and the second low number 32 that are each in the first type of data format. The result of the multiplication may be in the second type of data format. The multiplication operation 22 may be a matrix multiplication operation.

For example, if the first and second numbers 12, 26 are originally in float32 format, a multiplication operation may be executed on bfloat16 numbers, such as first and second low-high numbers 16, 18, 20, 28, 30, 32, to produce a result that is an output number in float32 format. For example, a single matrix in the second type of data format (e.g., float32 numbers) may be represented by three or more matrices in the first type of data format (e.g., in bfloat16) that may be added element-wise together to reconstruct the original matrix. Therefore, matrix multiplication of two matrices in the second type of data format may be expressed as sequence of matrix multiplications that consume only matrices in the first type of data format to produce a matrix output in the second type of data format. The matrix multiplication may be followed by element-wise addition.

For example, multiplication of the first number 12 and the second number 26 may be represented by:

$$\begin{aligned}&(\text{the first low number } 20 * \text{the second low number}\\&32)+(\text{the first low number } 20 * \text{the second}\\&\text{medium number } 30 + \text{the first medium number}\\&18 * \text{the second low number } 32) + (\text{the first low}\\&\text{number } 20 * \text{the second high number } 28 + \text{the first}\\&\text{medium number } 18 * \text{the second medium number}\\&30 + \text{the first high number } 16 * \text{the second low}\\&\text{number } 32) + (\text{the first medium number } 18 * \text{the}\\&\text{second high number } 28 + \text{the first high number}\\&16 * \text{the second medium number } 30) + (\text{the first}\\&\text{high number } 16 * \text{the second high number } 28)\end{aligned}$$ EQUATION I As illustrated, the first high number 16, the first medium number 18, the first low number 20, the second high number 28, the second medium number 30 and the second low number 32 may be multiplied together to generate a final output. Furthermore, the various operations above may have different exponential values because of the different exponential values of the first high number 16, the first medium number 18, the first low number 20, the second high number 28, the second medium number 30 and the second low number 32. For example, Table I below illustrates the various exponential values of the operations above:

TABLE I

|  | High Exponent | Medium High Exponent | Medium Exponent | Medium Low Exponent | Low Exponent |
|---|---|---|---|---|---|
| Operation | the first high number 16 * the second high number 28 | the first medium number 18 * the second high number 28 | the first high number 16 * the second low number 32 |  |  |
| Operation |  | the first high number 16 * the second medium number 30 | the first medium number 18 * the second medium number 30 | the first medium number 18 * the second low number 32 |  |
| Operation |  |  | the first low number 20 * the second high number 28 | the first low number 20 * the second medium number 30 | the first low number 20 * the second low number 32 |

Each column of Table I may identify operations with a same exponent rank. The leftmost column contains operations that result in the highest rank or that generate the most significant bits of the final output. Rightmost column contains operations with the lowest rank or the least significant bits of the final output. The significance of the operations increases from the right column to the left column.

For example assume that, the first and second numbers 12, 26 are float32, and that the first high number 16, the first medium number 18, the first low number 20, the second high number 28, the second medium number 30 and the second low number 32 are in Bfloat 16. Then, the "High Exponent" may be equal to the exponent of the first number 12 plus the exponent of the second number 26. The "Medium High Exponent" may be less than the exponent of the first number 12 minus 8 plus the exponent of the second number 26. The "Medium Exponent" may be less than the exponent of the first number 12 minus 16 plus the exponent of the second number 26. The "Medium Low Exponent" may be less than the exponent of the first number 12 minus 16 plus the exponent of the second number 26 minus 8. The "Low Exponent" may be less than the exponent of the first number 12 minus 16, plus the exponent of the second number 26 minus 16.

To calculate a complete result, the contents of each column may be accumulated to a common accumulator. For example, if the accumulator is a floating-point-style accumulator that contains exponent and signed mantissa (e.g., sign and magnitude) order of additions may be executed from lowest to highest rank or from the rightmost column to the leftmost column. Doing so may allow accumulation from lower to higher mantissa bits before truncations occur, for example during normalization of the result.

In some embodiments, some of the operations (e.g., the rightmost column operations) may be omitted. For example, if an accumulator has small amount of mantissa bits, some ranks may be skipped. For example, if the accumulator is a float32 accumulator, skipping the two last ranks (Medium Low Exponent and Low Exponent operations) may produce negligible error increases.

Furthermore, in some embodiments some of the ranks may be skipped based on performance metrics. For example, if the process 10 is associated with training process of a neural network, the process 10 may further consider adjusting the used ranks based on whether the neural network converges towards a solution (e.g., produces reliably consistent results). For example, to reduce the resources used, the process 10 may determine that only the High Exponent, the Medium High Exponent and the Medium Exponent rank operations are to be used to determine weights to train the neural network. Therefore, the multiplication operation 22 may only calculate the result of the High Exponent, the Medium High Exponent and the Medium Exponent ranks. The medium low exponent and low exponent ranks may not be calculated. Therefore, the multiplication execution 22 may utilize less resources to generate the third number 34, at a cost to accuracy and granularity.

The neural network may use the third number 34 for training. If the neural network does not converge towards a solution, then the process 10 may be adjusted to include more ranks to calculate the third number 34 (e.g., the medium low exponent rank and the low exponent rank). Therefore, the granularity and accuracy of the process 10 may be adjusted based on a performance metric (e.g., whether accurate outputs are being achieved).

In the alternative, if an accumulator has large amount of mantissa bits an order of the operations may be important.

For example, if the accumulator is approximately the 256+log 2(num_of_addends), the number of mantissa bits addition may become lossless.

Process 10 illustrates multiplication of two numbers 12, 26. In some embodiments, process 10 may be applied to a larger sized matrix multiplication in which a plurality of matrix numbers is multiplied against a plurality of matrix numbers. For example, to multiply float32 matrices of size 32×32 using Bfloat16 hardware units, each of the values may be converted into three Bfloat16 values. This generates three 32×32 Bfloat16-only matrices for each float32 matrix value. Those matrices may be multiplied together as described in Table I above, with intermediate results stored in accumulators. Final results may be converted to a target precision (either float32 or bfloat).

Therefore, process 10 introduces a way for implementing multiplication based on various data types. For example, the resulting multiplication 22 results in a third number 34 that may be in the second type of data format. As noted, the multiplication operation 22 accepts low-high numbers 16, 18, 20, 28, 30, 32 that are in the first type of data format to produce the third number 34 in the second type of data format. Moreover, the granularity of the process 10 may be adjusted on the fly to balance accuracy of the third number 34 against performance costs.

Figure 2:
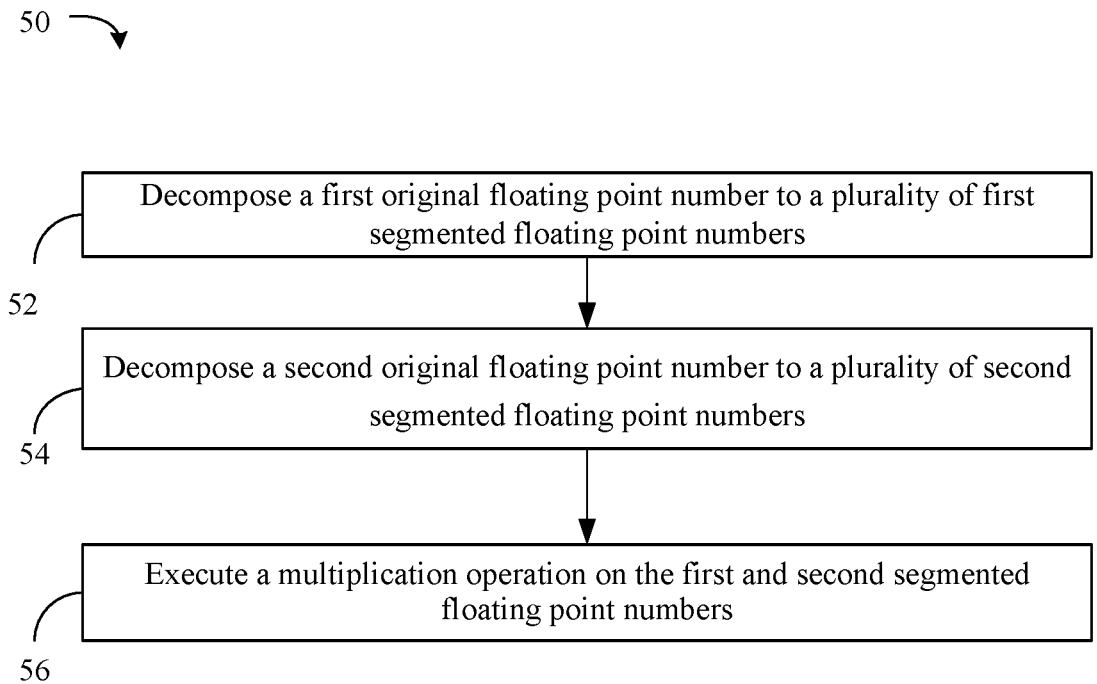
FIG. 2 is a flowchart of an example of a method of executing multiplication according to an embodiment.

FIG. 2 shows a method 50 of executing multiplication. In an embodiment, the method 50 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52, in response to an identification that one or more hardware units are to execute on a first type of data format, decomposes a first original floating point number to a plurality of first segmented floating point numbers. The plurality of first segmented floating point numbers are to be equivalent to the first original floating point number. One or more of the first segmented floating point numbers has a first total number of bits that are different than a second total number of bits of the first original floating point number.

Processing block 54, in response to the identification, decomposes a second original floating point number to a plurality of second segmented floating point numbers. The second segmented floating point numbers are to be equivalent to the second original floating point number. One or more of the second segmented floating point numbers has a third total number of bits that are different than a fourth total number of bits of the second original floating point number.

Processing block 56 executes a multiplication operation on the first and second segmented floating point numbers to multiply the first segmented floating point numbers with the second segmented floating point numbers. For example, processing block 56 multiplies a subset of the plurality of first segmented floating point numbers with a subset of the plurality of second segmented floating point numbers to generate a plurality of values. In some embodiments, processing block 56 includes executing a matrix multiplication operation that is to include an addition of the plurality of values together to generate a final output.

In some embodiments, the method 50 includes storing a summation of the plurality of values in a first accumulator and storing the final output in a second accumulator. For example, a first value may be stored in the first accumulator, where the first value is a summation of only a subset of the plurality of values. Furthermore, the final output is generated by adding the first value, that is stored in the first accumulator, to a second value stored in the second accumulator to generate the final output.

Figure 3A:
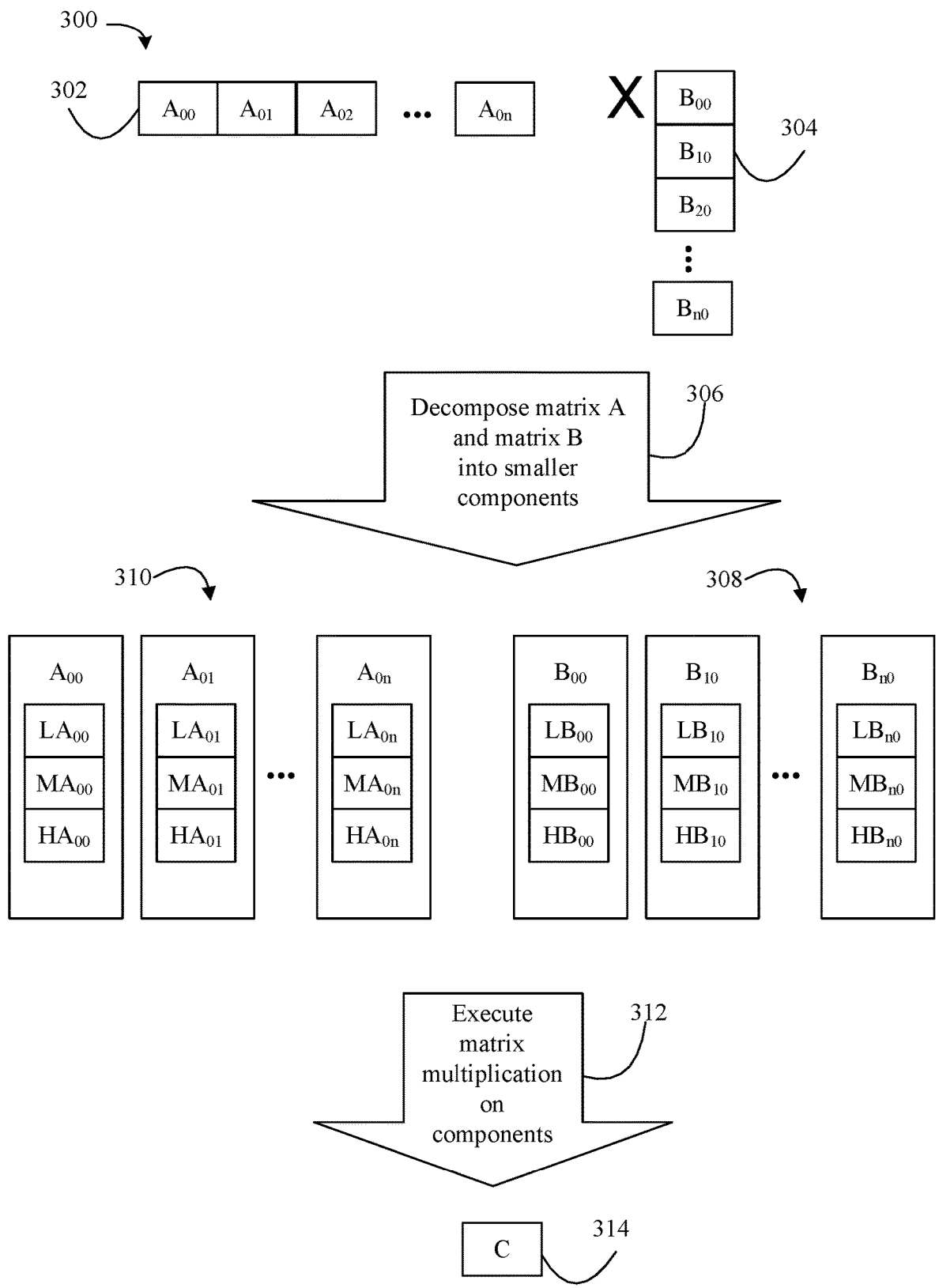

FIG. 3A illustrates a process 300 to execute matrix multiplication. In detail, a first matrix A 302 is multiplied with a second matrix B 304. The first matrix A 302 may be composed of blocks $A_{00}, A_{01}, A_{02} \ldots A_{0n}$. Each of blocks $A_{00}, A_{01}, A_{02} \ldots A_{0n}$ may be of a second data format (e.g., FP32). Thus, the first matrix A 302 may be approximately 32×(N*32). Likewise, the second matrix B 304 may be composed of four blocks $B_{00}, B_{10}, B_{20}, B_{n0}$ that are each of the second data format to be approximately (N*32)×32. Each of blocks $A_0, A_1, A_2 \ldots A_n, B_0, B_1, B_2 \ldots B_n$ may be decomposed to execute matrix multiplication. For example, process 300 may decompose the matrix A 302 and the second matrix B 304 into smaller components 306. For example, for some applications of Generic Element Matrix Multiplication (GEMM) sizes, the input blocks $A_{00}, A_{01}, A_{02}, A_{0n}, B_{00}, B_{10}, B_{20}$, Boo are blocked into smaller components.

For example, the first matrix A 302 may be decomposed into a plurality of components 310 and the second matrix B 304 may be decomposed into a plurality of components 308. Each of the components 310 may be of a first data format (e.g., Bfloat16) that is different than the second data format. Block $A_{00}$ may be decomposed into three components including a low component $LA_{00}$, a medium component $MA_{00}$ and a high component $HA_{00}$. For example, a sum of the low component $LA_{00}$, the medium component $MA_{00}$ and the high component HAN may be approximately or precisely equal to $A_{00}$ of the first matrix A 302. In detail, the low component $LA_{00}$, the medium component $MA_{00}$ and a high component HAN may include corresponding portions of a mantissa of the block $A_{00}$ of the first matrix A 302 as described above with FIG. 1. Likewise, each of the other blocks $A_{01}, A_{02} \ldots A_{0n}$ of the first matrix A 302 and blocks $B_0, B_1, B_2 \ldots B_{n0}$ of the second matrix B 304 may be decomposed into components 310, 308 to each be approximately or precisely equal to sums of the smaller components. For example, the components 310, 308 may include low components $LA_{01}$-$LA_{0n}$, $LB_{01}$-$LB_{n0}$, medium components $MA_{01}$-$MA_{0n}$, $MB_{00}$-$MB_{n0}$ and high components $HA_{01}$-$HA_{0n}$, $HB_{00}$-$HB_{n0}$.

The process 300 may include execution of a matrix multiplication operation on the components 310, 308 generate a final output C 314. In order to compute final output C 314, several operations may be executed. An output of each operation is called a "Partial Product." These Partial Products may be accumulated to compute a final result. To maintain a certain level of accuracy and/or precision, an accumulator may need to be of a sufficient size to ensure that relevant bits are not getting dropped.

FIG. 3B illustrates a more detailed embodiment of the execution of the matrix multiplication 306 in which a single long accumulator $P_{P00}$ (e.g., 256 bits) is employed. Operation One 320 may be the equivalent of $_{A00}*_{B00}$ of the matrices 302, 304. Operation One 320 may multiply low component $L_{A00}$ with low component $L_{B00}$ and store the result in the partial product accumulator $P_{P00}$. $P_{P00}$ may be normalized at this time, and each time a new product is added to $P_{P00}$. The medium components $M_{A00}$ and $L_{B00}$ may be multiplied together, added to the partial product $P_{P00}$ and then stored in the partial product $P_{P00}$. Operation One 320 may proceed as described herein to multiply each of the low, mid and high components $L_{A00}, M_{A00}, H_{A00}$ with each of the low, mid and high components $L_{B00}, M_{B00}, H_{B00}$ and add the resulting products to the partial product accumulator $P_{P00}$. For example, Operation One 320 may multiply $H_{A00}$ and $H_{B00}$ together, add the result of the product to the partial product accumulator $P_{P00}$ and store the final result in the partial product accumulator $P_{P00}$.

Operation Two 322 may then execute. Operation Two 322 may be the equivalent of $A_{01}*B_{10}$ of the matrices 302, 304. Operation Two 322 may proceed as described herein to multiply each of the low, mid and high components $LA_{01}$, $MA_{01}$, $HA_{01}$ with each of the low, mid and high components $LB_{10}, MB_{10}, HB_{10}$ and add the resulting products to the partial product accumulator $PP_{00}$. The execution of the matrix multiplication 312 may then iterate similarly to as described above to execute unillustrated operations to calculate the equivalence of $A_{02}$ multiplied with $B_{20}$ and the remainder of the matrix multiplication operations until Operation N 324.

Operation N 324 be the equivalent of $A_{0n}*B_{n0}$ of the matrices 302, 304. Similarly to as described above, each of the low, mid and high components $LA_{0n}, MA_{0n}, HA_{0n}$ may be multiplied with each of the low, mid and high components $LB_{n0}, MB_{n0}, HB_{n0}$ with the resulting products being added to the partial product accumulator $PP_{00}$. The final calculation results in final product C.

As illustrated, each of the Operations One-N 320, 322, 324 processes in an order from the least significant numbers to the most significant numbers to avoid truncation. For example, each of the Operations One 320-Operations N 324 processes from the low components $LA_{00}$-$LA_{0n}, LB_{00}$-$LB_{n0}$ (e.g., the smallest numbers), to the medium components $MA_{00}$-$MA_{0n}, MB_{00}$-$MB_{n0}$ (e.g., the medium numbers) and lastly the high components $HA_{00}$-$HA_{0n}, HB_{00}$-$HB_{n0}$ (e.g., the largest numbers).

For example, Operation One 320 executes the multiplication of the low components $LA_{00}$ and $LB_{00}$ before the multiplication of the high components $HA_{00}$ and $HB_{00}$. Doing so may reduce the possibility of losing lower order bits before normalization of the partial product accumulator $PP_{00}$. That is, $LA_{00}$ and $LB_{00}$ may produce a significantly smaller product than $HA_{00}$ and $HB_{00}$. Normalization (e.g., storing in scientific notation with one non-zero decimal digit before the decimal point) may result in truncation of lower digits due to size constraints of the partial product accumulator $PP_{00}$.

FIG. 3C illustrates another more detailed embodiment of the execution of the matrix multiplication 312 in which two accumulators AP, MP are employed instead of one accumulator. Master accumulator MP may be a master accumulator of a smaller size (e.g., 32 bits). The active accumulator AP may be a smaller size as well (e.g., 38 bits) but larger than the master accumulator MP. Having two smaller accumulators AP, MP may be high precision and reduce an amount of required hardware and area relative to employing one large accumulator.

Operation One 330 may be the equivalent of $A_{00}*B_{00}$ of the matrices 302, 304. Operation One 330 may multiply low component $LA_{00}$ with low component $LB_{00}$ and store the result in the active accumulator AP. The active accumulator AP may be normalized at this time, and each time a new product is added to the active accumulator AP. The medium component $MA_{00}$ and low component $LB_{00}$ may be multiplied together, added to the active accumulator AP and then stored in the active accumulator AP. Operation One 330 may proceed as described herein to multiply each of the low, mid and high components $LA_{00}$, $MA_{00}$, $HA_{00}$ with each of the low, mid and high components $LB_{00}$, $MB_{00}$, $HB_{00}$ and add the resulting products to the active accumulator AP. Lastly, Operation One 320 may multiply $HA_{00}$ and $HB_{00}$ together, add the result of the product to the active accumulator AP and store the final result in the master accumulator MP. The active accumulator AP may also be reset to 0 before Operation Two 332 executes.

Operation Two 332 may then execute. Operation Two 332 may be the equivalent of $A_{01}*B_{10}$ of the matrices 302, 304. Operation Two 332 may proceed as described herein to multiply each of the low, mid and high components $LA_{01}$, $MA_{01}$, $HA_{01}$ with each of the low, mid and high components $LB_{10}$, $MB_{10}$, $HB_{10}$ and add the resulting products to the active accumulator AP. As illustrated, after processing of the highest components $HA_{01}$ and $HB_{10}$, the active accumulator AP is added to the master accumulator MP and stored in the master accumulator MP. The active accumulator AP may be reset to 0. The execution of the matrix multiplication 312 may then iterate similarly to as described above to execute unillustrated operations to calculate the equivalence the remainder of the matrix multiplication operations until Operation N 324.

Operation N 334 be the equivalent of $A_{0n}*B_{n0}$ of the matrices 302, 304. Similarly to as described above, each of the low, mid and high components $LA_{0n}$, $MA_{0n}$, $HA_{0n}$ may be multiplied with each of the low, mid and high components $LB_{n0}$, $MB_{n0}$, $HB_{n0}$ with the resulting products being added to the active accumulator AP. The active accumulator AP is eventually added to the master accumulator MP to generate the final product C.

As illustrated, each of the Operations One-N 330, 332, 334 processes in an order from the least significant numbers to the most significant numbers to avoid truncation. For example, each of the Operations One 330-Operations N 334 processes from the low components $LA_{00}$-$LA_{0n}$, $LB_{00}$-$LB_{n0}$ (e.g., the smallest numbers), to the medium components $MA_{00}$-$MA_{0n}$, $MB_{00}$-$MB_{n0}$ (e.g., the medium numbers) and lastly the high components $HA_{00}$-$HA_{0n}$, $HB_{00}$-$HB_{n0}$ (e.g., the largest numbers).

For example, Operation One 330 executes the multiplication of the low components $LA_{00}$ and $LB_{00}$ before the multiplication of the high components HAN) and $HB_{00}$. Doing so may reduce the possibility of losing lower order bits before normalization of the active accumulator AP. That is, multiplication of $LA_{00}$ and $LB_{00}$ may produce a significantly smaller value than a value of the product of $HA_{00}$ and $HB_{00}$. Likewise, several of the other illustrated multiplications (e.g., $MA_{00} \times LB_{00}$) may result in significantly smaller values than the value of product of $HA_{00}$ and $HB_{00}$. Normalization (e.g., storing in scientific notation with one non-zero decimal digit before the decimal point) may result in truncation of smaller values due to size constraints of the active accumulator AP. A sum of the smaller values however may be large enough to avoid truncation. Thus, to avoid losing the cumulative sum of the smaller values, $HA_{00}$ and $HB_{00}$ are processed last in Operation One 330.

As described above, both the embodiments described in FIGS. 3B and 3C may be adjusted based on performance metrics. For example, lower granularity may be used to omit some lower component operations while achieving certain performance metrics (e.g., converging towards a solution, achieve correct outcomes, processing within a certain time period). Furthermore, the size of the matrices described above may be adjusted without affecting the applicability or application of the above.

Figure 4:
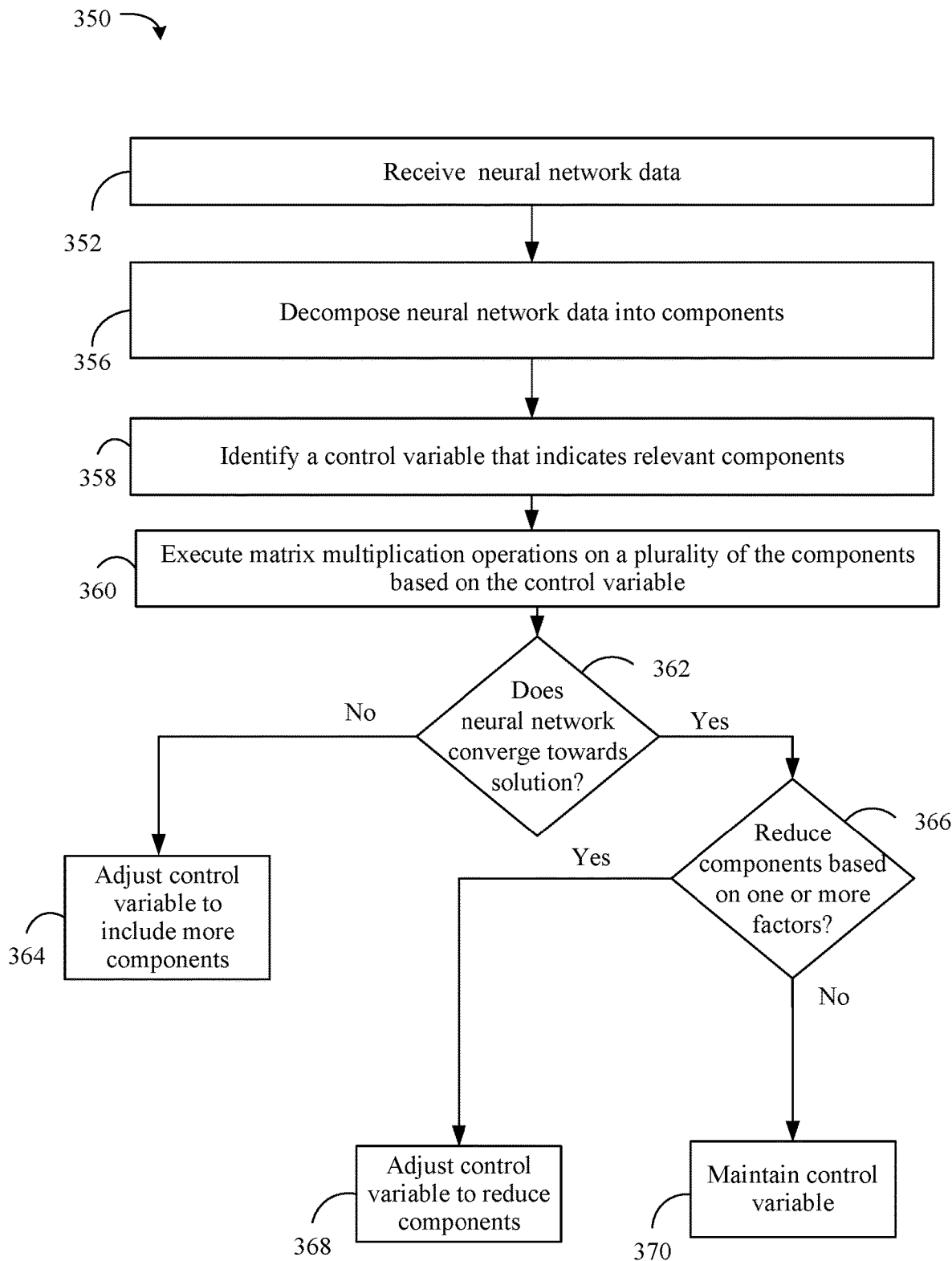
FIG. 4 is a flowchart of an example of a method of adjusting a granularity of matrix multiplication operations according to an embodiment.

FIG. 4 shows a method 350 of adjusting a granularity of matrix multiplication operations as described above with respect to the processes of 10 and 300. More particularly, the method 350 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Processing block 352 receives neural network data. The neural network data may be matrices that each contain numbers. Processing block 356 may decompose the neural network data into components. For example, the matrices may each be decomposed into low, middle and high components. Processing block 358 may identify a control variable that indicates relevant components. For example, the control variable may indicate a granularity of matrix multiplication operations. Processing block 360 may execute matrix multiplication operations on a plurality of the low, middle and high components based on the control variable. For example, the control variable may indicate that only higher order components are to be processed during the matrix multiplication. Doing so may reduce a time and hardware cost of the matrix multiplication at a cost to accuracy. In some other embodiments, the control variable may indicate that all the low, middle and high components are to be processed during the matrix multiplication.

Processing block 362 determines whether the neural network converges towards a solution. If not, processing block 364 adjusts the control variable to include more components. For example assume that the control variable originally indicated that only the high components were used during the matrix multiplication. The control variable may then be adjusted to include the high and middle components during future neural network processing.

If processing block 362 determines that the neural network converges towards a solution, processing block 366 may determine whether to reduce the components based on one or more factors. For example, the one or more factors may include whether a desired processing time is being met, whether a reduction in hardware usage is required, whether a previously unsuccessful reduction occurred in the past. For example, if the control variable currently indicates that the high and middle components are to be processed, processing block 366 may determine whether the control variable was ever reduced to only include the high components in the past, and whether the reduction resulted in convergence. If the control variable was successfully reduced in the past, processing block 368 may adjust the control variable to reduce the components to include only the high components. If the control variable was not successfully reduced in the past, processing block 370 may maintain the control variable without any adjustment. If there is no indication of whether a previous reduction was successful, processing block 368 may execute.

Thus, if processing block 366 determines that the components should not be reduced, processing block 370 may maintain the control variable without any adjustment. If processing block 366 determines that the components should be reduced, processing block 368 may adjust the control variable to reduce the components.

Figure 5:
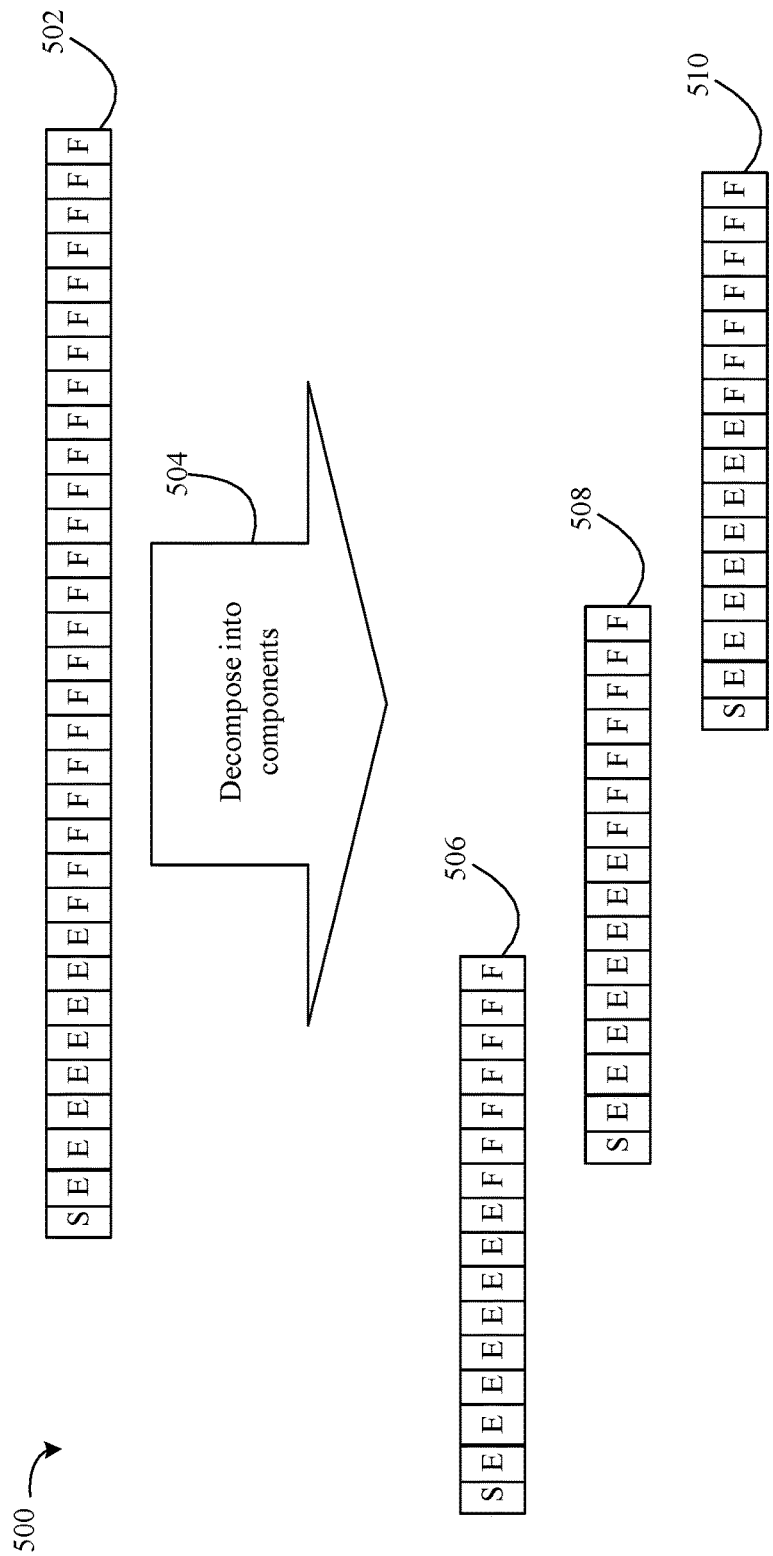
FIG. 5 is an example of a process of number decomposition according to an embodiment.

FIG. 5 illustrates a process 500 to decompose a FP32 number to Bfloat16 numbers. In detail, number 502 is an FP32 representation that includes a mantissa that is approximately 23 bits (23 bits fraction). The mantissa may be the portions labeled with "F." The number 502 may further include a sign bit (labeled as "S") and 8 exponent bits labeled as "E." Process 504 may decompose the number 502 into Bfloat16 numbers 506, 508, 510 similarly to as described above. Each of the numbers 506, 508, 510 may be a Bfloat16 representation with the mantissa being approximately 7 bits, a single sign bit, and 8 exponent bits. Thus, the FP32 number 502 may naturally fit into the three Bfloat16 numbers 506, 508, 510. In some embodiments, the mantissas of the numbers 502, 506, 508, 510 may be increased by a bit to include an implicit J-bit.

Figure 6:
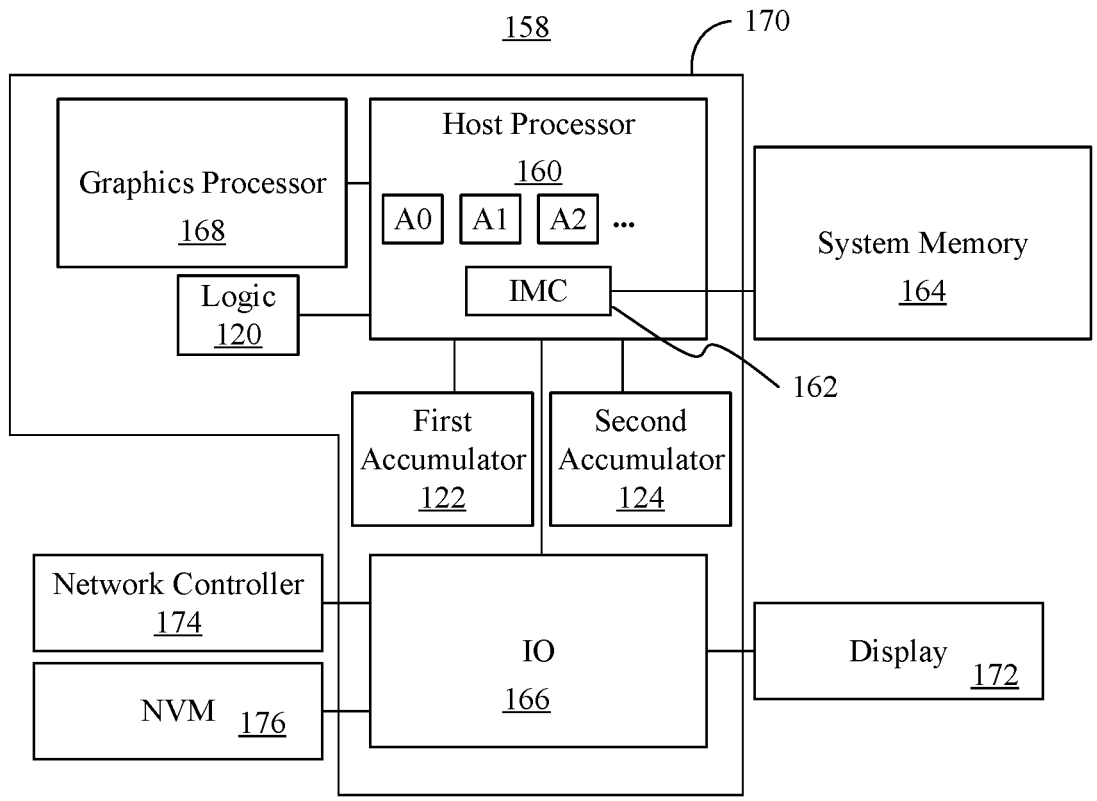
FIG. 6 is a block diagram of an example of a computing system according to an embodiment.

Turning now to FIG. 6, an efficiency-enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., CPU with one or more processor cores) having an integrated memory controller (IMC) 162 that is coupled to a system memory 164.

The illustrated system 158 also includes a graphics processor 168 (e.g., graphics processing unit/GPU) and an input output (10) module 166 implemented together with the processor 160 (e.g., as microcontrollers) on a semiconductor die 170 as a system on chip (SOC), where the IO module 166 may communicate with, for example, a display 172 (e.g., touch screen, liquid crystal display/LCD, light emitting diode/LED display), a network controller 174 (e.g., wired and/or wireless), and mass storage 176 (e.g., HDD, optical disc, SSD, flash memory or other NVM).

The illustrated SOC 170 includes a series of accelerators A0-A2. The accelerators A0-A2 may be configured to execute an operation on a first type of data format (e.g., Bfloat 16). The SOC 170 may further include logic 120 with logic instructions, which when executed by the host processor 160, cause the computing system 158 to perform one or more aspects of the process 10 of FIG. 1, the method 50 of FIG. 2, the process 300 of FIG. 3A, the method 350 of FIG. 4, the process 500 of FIG. 5, already discussed. In some embodiments, the system memory 164 may include instructions, which when executed by the computing system 158, cause the computing system 158 to perform one or more aspects of the process 10 of FIG. 1, the method 50 of FIG. 2, the process 300 of FIG. 3A, the method 350 of FIG. 4, the process 500 of FIG. 5. The SOC 170 may further include a first accumulator 122 (e.g., a hardware register) and a second accumulator 124 (e.g., a hardware register). The first accumulator 122 may be a different size than the second accumulator 124. The first accumulator 122 may store temporary outputs associated with the execution of the one or more aspects, while the second accumulator 124 may store a total output associated with the execution of the one or more aspects.

Thus, the illustrated SOC 170 may decompose a first original floating point number (e.g., a FP32 number) to a plurality of first segmented floating point numbers (e.g., Bfloat16 numbers). A sum of the first segmented floating point numbers may be equivalent to the first original floating point number. The SOC 170 may further decompose a second original floating point number (e.g., a FP32 number) to a plurality of second segmented floating point numbers (e.g., Bfloat16 numbers). A sum of the plurality of second segmented floating point numbers may be equivalent to the second original floating point number. The SOC 170 may use the accelerators A0-A2 to execute a multiplication operation on the first and second segmented floating point numbers to multiply the first segmented floating point numbers with the second segmented floating point numbers, and store outputs in the first accumulator 122 and the second accumulator 124.

Accordingly, the computing system 100 may be considered to be efficiency enhanced in that the computing system 100 may utilize existing hardware, such as accelerators A0-A2, to execute operations on different types of data formats. Therefore, specialized hardware for each type of data format may not be needed, thereby reducing the size of SOC 170 while increasing the flexibility and functionality of the SOC 170. Moreover, the usage of first and second accumulators 122, 124 may reduce the space needed for the SOC 170. For example, if the first and second accumulators 122, 124 were replaced by one large accumulator, a size of the one large accumulator would be far larger than a combined size of the first and second accumulators 122, 124.

Figure 7:
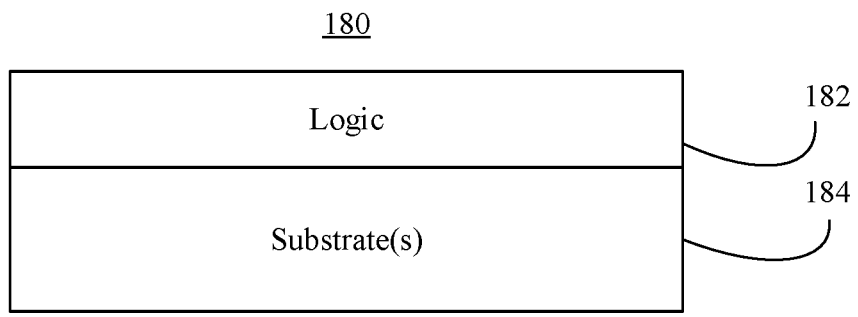
FIG. 7 is an illustration of an example of a semiconductor apparatus according to an embodiment.

FIG. 7 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement one or more aspects of the process 10 of FIG. 1, the method 50 of FIG. 2, The process 300 of FIG. 3A, the method 350 of FIG. 4, the process 500 of FIG. 5, already discussed. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 8:
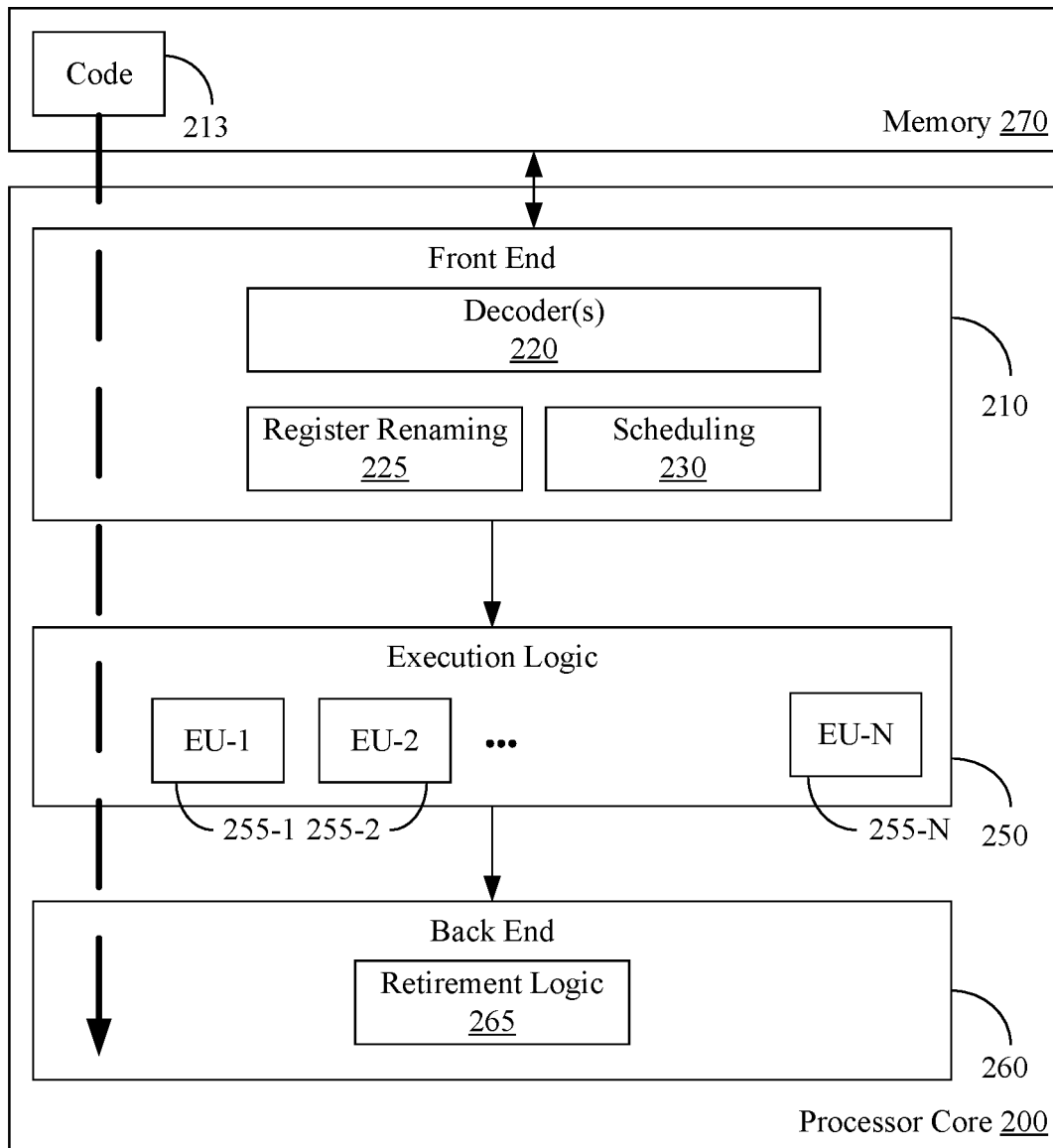
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the process 10 of FIG. 1, the method 50 of FIG. 2, The process 300 of FIG. 3A, the method 350 of FIG. 4, the process 500 of FIG. 5, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI)

bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the process 10 of FIG. 1, the method 50 of FIG. 2, The process 300 of FIG. 3A, the method 350 of FIG. 4, the process 500 of FIG. 5, already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 may include a computing system comprising a host processor that are to execute on a first data format, the host processor including a plurality of accelerators, and a memory coupled to the host processor, the memory including executable program instructions, which when executed by the host processor, cause the computing system to in response to an identification that the accelerators execute on the first type of data format, decompose a first original floating point number to a plurality of first segmented floating point numbers that are to be equivalent to the first original floating point number, in response to the identification, decompose a second original floating point number to a plurality of second segmented floating point numbers that are to be equivalent to the second original floating point number, and execute, by one or more of the plurality of accelerators, a multiplication operation on the first and second segmented floating point numbers to multiply the first segmented floating point numbers with the second segmented floating point numbers.

Example 2 may include the computing system of Example 1, wherein the executable program instructions, when executed by the computing system, cause the computing system to execute the multiplication operation to multiply a subset of the plurality of first segmented floating point numbers with a subset of the plurality of second segmented floating point numbers to generate a plurality of values Example 3 may include the computing system of Example 2, wherein the executable program instructions, when executed by the computing system, cause the computing system to execute a matrix multiplication operation that is to include an addition of the plurality of values together to generate a final output.

Example 4 may include the computing system of Example 3, wherein the executable program instructions, when executed by the computing system, cause the computing system to store a summation of the plurality of values in a first accumulator, and store the final output in a second accumulator.

Example 5 may include the computing system of Example 4, wherein the executable program instructions, when executed by the computing system, cause the computing system to store a first value in the first accumulator, wherein the first value is a summation of only a subset of the plurality of values, and add the first value, that is stored in the first accumulator, to a second value stored in the second accumulator to generate the final output.

Example 6 may include the computing system of any one of the Examples 1 to 5, wherein the executable program instructions, when executed by the computing system, cause the computing system to generate one or more of the first segmented floating point numbers to have a first total number of bits that are different than a second total number of bits of the first original floating point number, and generate one or more of the second segmented floating point numbers to have a third total number of bits that are different than a fourth total number of bits of the second original floating point number.

Example 7 may include a semiconductor apparatus comprising one or more substrates, and logic coupled to the one or more substrates, wherein the logic is implemented in one or more of configurable logic or fixed-functionality logic hardware, the logic coupled to the one or more substrates to in response to an identification that one or more hardware units are to execute on a first type of data format, decompose a first original floating point number to a plurality of first segmented floating point numbers that are to be equivalent to the first original floating point number, in response to the identification, decompose a second original floating point number to a plurality of second segmented floating point numbers that are to be equivalent to the second original floating point number, and execute a multiplication operation on the first and second segmented floating point numbers to multiply the first segmented floating point numbers with the second segmented floating point numbers.

Example 8 may include the apparatus of Example 7, wherein the logic coupled to the one or more substrates is to execute the multiplication operation to multiply a subset of the plurality of first segmented floating point numbers with a subset of the plurality of second segmented floating point numbers to generate a plurality of values.

Example 9 may include the apparatus of Example 8, wherein the logic coupled to the one or more substrates is to execute a matrix multiplication operation that is to include an addition of the plurality of values together to generate a final output.

Example 10 may include the apparatus of Example 9, wherein the logic coupled to the one or more substrates is to store a summation of the plurality of values in a first accumulator, and store the final output in a second accumulator.

Example 11 may include the apparatus of Example 10, wherein the logic coupled to the one or more substrates is to store a first value in the first accumulator, wherein the first value is a summation of only a subset of the plurality of values, and add the first value, that is stored in the first accumulator, to a second value stored in the second accumulator to generate the final output.

Example 12 may include the apparatus of any one of Examples 7 to 11, wherein the logic coupled to the one or more substrates is to generate one or more of the first segmented floating point numbers to have a first total number of bits that are different than a second total number of bits of the first original floating point number, and generate one or more of the second segmented floating point numbers to have a third total number of bits that are different than a fourth total number of bits of the second original floating point number.

Example 13 may include the apparatus of Example 7, wherein the logic coupled to the one or more substrates includes transistor channel regions that are positioned within the one or more substrates.

Example 14 may include at least one computer readable storage medium comprising a set of instructions, which when executed by a computing device, cause the computing device to in response to an identification that one or more hardware units are to execute on a first type of data format, decompose a first original floating point number to a plurality of first segmented floating point numbers that are to be equivalent to the first original floating point number, in response to the identification, decompose a second original floating point number to a plurality of second segmented floating point numbers that are to be equivalent to the second original floating point number, and execute a multiplication operation on the first and second segmented floating point numbers to multiply the first segmented floating point numbers with the second segmented floating point numbers.

Example 15 may include the at least one computer readable storage medium of Example 14, wherein the instructions, when executed, cause the computing device to execute the multiplication operation to multiply a subset of the plurality of first segmented floating point numbers with a subset of the plurality of second segmented floating point numbers to generate a plurality of values.

Example 16 may include the at least one computer readable storage medium of Example 15, wherein the instructions, when executed, cause the computing device to execute a matrix multiplication operation that is to include an addition of the plurality of values together to generate a final output.

Example 17 may include the at least one computer readable storage medium of Example 16, wherein the instructions, when executed, cause the computing device to store a summation of the plurality of values in a first accumulator, and store the final output in a second accumulator.

Example 18 may include the at least one computer readable storage medium of Example 17, wherein the instructions, when executed, cause the computing device to store a first value in the first accumulator, wherein the first value is a summation of only a subset of the plurality of values, and add the first value, that is stored in the first accumulator, to a second value stored in the second accumulator to generate the final output.

Example 19 may include the at least one computer readable storage medium of any one of Examples 14 to 18, wherein the instructions, when executed, cause the computing device to generate one or more of the first segmented floating point numbers to have a first total number of bits that are different than a second total number of bits of the first original floating point number, and generate one or more of the second segmented floating point numbers to have a third total number of bits that are different than a fourth total number of bits of the second original floating point number.

Example 20 may include a method comprising in response to an identification that one or more hardware units are to execute on a first type of data format, decomposing a first original floating point number to a plurality of first segmented floating point numbers that are to be equivalent to the first original floating point number, in response to the identification, decomposing a second original floating point number to a plurality of second segmented floating point numbers that are to be equivalent to the second original floating point number, and executing a multiplication operation on the first and second segmented floating point numbers to multiply the first segmented floating point numbers with the second segmented floating point numbers.

Example 21 may include the method of Example 20, further comprising executing the multiplication operation to multiply a subset of the plurality of first segmented floating point numbers with a subset of the plurality of second segmented floating point numbers to generate a plurality of values.

Example 22 may include the method of Example 21, further comprising executing a matrix multiplication operation that is to include an addition of the plurality of values together to generate a final output.

Example 23 may include the method of Example 22, further comprising storing a summation of the plurality of values in a first accumulator, and storing the final output in a second accumulator.

Example 24 may include the method of Example 23, further comprising storing a first value in the first accumulator, wherein the first value is a summation of only a subset of the plurality of values, and adding the first value, that is stored in the first accumulator, to a second value stored in the second accumulator to generate the final output.

Example 25 may include the method of any one of Examples 20 to 24, further comprising generating one or more of the first segmented floating point numbers to have a first total number of bits that are different than a second total number of bits of the first original floating point number, and generating one or more of the second segmented floating point numbers to have a third total number of bits that are different than a fourth total number of bits of the second original floating point number.

Thus, technology described herein may support an enhanced architecture to support complex matrix multiplication on existing hardware. The technology may also enable a dynamically scalable architecture that adjusts granularity of matrix multiplication operations on-the-fly to reduce hardware usage while achieving a desirable outcome.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a host processor, the host processor including a plurality of accelerators that are to execute on a first type of data format; and
a memory coupled to the host processor, the memory including executable program instructions, which when executed by the host processor, cause the computing system to:
in response to an identification that the plurality of accelerators execute on the first type of data format, decompose a first original floating point number to a plurality of first segmented floating point numbers that are to be equivalent to the first original floating point number, wherein the first original floating point number is in a second type of data format;
in response to the identification, decompose a second original floating point number to a plurality of second segmented floating point numbers that are to be equivalent to the second original floating point number, wherein the second original floating point number is in the second type of data format;
execute, by one or more of the plurality of accelerators, a plurality of multiplication operations on the first and second segmented floating point numbers to multiply subsets of the first segmented floating point numbers with subsets of the second segmented floating point numbers to determine a plurality of values; and
store a summation of the plurality of values in an accumulator, wherein the summation corresponds to a final result of a multiplication operation of the first original floating point number and the second original floating point number.

2. The computing system of claim 1, wherein the executable program instructions, when executed by the host processor, cause the computing system to execute a matrix multiplication operation that is to include an addition of the plurality of values together to generate a final output.

3. The computing system of claim 2, wherein the accumulator is a second accumulator,
further wherein the executable program instructions, when executed by the host processor, cause the computing system to:
store a summation of at least two of the plurality of values in a first accumulator; and
store the final output in the second accumulator.

4. The computing system of claim 3, wherein the executable program instructions, when executed by the host processor, cause the computing system to:
store a first value in the first accumulator, wherein the first value is a summation of only a subset of the plurality of values; and
add the first value, that is stored in the first accumulator, to a second value stored in the second accumulator to generate the final output.

5. The computing system of claim 1, wherein the executable program instructions, when executed by the host processor, cause the computing system to:
generate one or more of the first segmented floating point numbers to have a first total number of bits that are different than a second total number of bits of the first original floating point number; and
generate one or more of the second segmented floating point numbers to have a third total number of bits that are different than a fourth total number of bits of the second original floating point number.

6. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
in response to an identification that one or more hardware units are to execute on a first type of data format, decompose a first original floating point number to a plurality of first segmented floating point numbers that are to be equivalent to the first original floating point number, wherein the first original floating point number is in a second type of data format;
in response to the identification, decompose a second original floating point number to a plurality of second segmented floating point numbers that are to be equivalent to the second original floating point number, wherein the second original floating point number is in the second type of data format;
execute a plurality of multiplication operations on the first and second segmented floating point numbers to multiply subsets of the first segmented floating point numbers with subsets of the second segmented floating point numbers to determine a plurality of values; and
store a summation of the plurality of values in an accumulator, wherein the summation corresponds to a final result of a multiplication operation of the first original floating point number and the second original floating point number.

7. The apparatus of claim 6, wherein the logic coupled to the one or more substrates is to execute a matrix multiplication operation that is to include an addition of the plurality of values together to generate a final output.

8. The apparatus of claim 7, wherein the accumulator is a second accumulator,
further wherein the logic coupled to the one or more substrates is to:
store a summation of at least two of the plurality of values in a first accumulator; and
store the final output in the second accumulator.

9. The apparatus of claim 8, wherein the logic coupled to the one or more substrates is to:
store a first value in the first accumulator, wherein the first value is a summation of only a subset of the plurality of values; and
add the first value, that is stored in the first accumulator, to a second value stored in the second accumulator to generate the final output.

10. The apparatus of claim 6, wherein the logic coupled to the one or more substrates is to:
generate one or more of the first segmented floating point numbers to have a first total number of bits that are different than a second total number of bits of the first original floating point number; and
generate one or more of the second segmented floating point numbers to have a third total number of bits that are different than a fourth total number of bits of the second original floating point number.

11. The apparatus of claim 6, wherein the logic coupled to the one or more substrates includes transistor channel regions that are positioned within the one or more substrates.

12. At least one non-transitory computer readable storage medium comprising a set of instructions, which when executed by a computing device, cause the computing device to:
in response to an identification that one or more hardware units are to execute on a first type of data format, decompose a first original floating point number to a plurality of first segmented floating point numbers that are to be equivalent to the first original floating point number, wherein the first original floating point number is in a second type of data format;
in response to the identification, decompose a second original floating point number to a plurality of second segmented floating point numbers that are to be equivalent to the second original floating point number, wherein the second original floating point number is in the second type of data format;
execute a plurality of multiplication operations on the first and second segmented floating point numbers to multiply subsets of the first segmented floating point numbers with subsets of the second segmented floating point numbers to determine a plurality of values; and
store a summation of the plurality of values in an accumulator, wherein the summation corresponds to a final result of a multiplication operation of the first original floating point number and the second original floating point number.

13. The at least one non-transitory computer readable storage medium of claim 12, wherein the instructions, when executed, cause the computing device to execute a matrix multiplication operation that is to include an addition of the plurality of values together to generate a final output.

14. The at least one non-transitory computer readable storage medium of claim 13, wherein the accumulator is a second accumulator,
further wherein the instructions, when executed, cause the computing device to:
store a summation of at least two of the plurality of values in a first accumulator; and
store the final output in the second accumulator.

15. The at least one non-transitory computer readable storage medium of claim 14, wherein the instructions, when executed, cause the computing device to:
store a first value in the first accumulator, wherein the first value is a summation of only a subset of the plurality of values; and
add the first value, that is stored in the first accumulator, to a second value stored in the second accumulator to generate the final output.

16. The at least one non-transitory computer readable storage medium of claim 12, wherein the instructions, when executed, cause the computing device to:
generate one or more of the first segmented floating point numbers to have a first total number of bits that are different than a second total number of bits of the first original floating point number; and
generate one or more of the second segmented floating point numbers to have a third total number of bits that are different than a fourth total number of bits of the second original floating point number.

17. A method comprising:
in response to an identification that one or more hardware units are to execute on a first type of data format, decomposing a first original floating point number to a plurality of first segmented floating point numbers that are to be equivalent to the first original floating point number, wherein the first original floating point number is in a second type of data format;
in response to the identification, decomposing a second original floating point number to a plurality of second segmented floating point numbers that are to be equivalent to the second original floating point number, wherein the second original floating point number is in the second type of data format;
executing a plurality of multiplication operations on the first and second segmented floating point numbers to multiply subsets of the first segmented floating point numbers with subsets of the second segmented floating point numbers to determine a plurality of values; and
storing a summation of the plurality of values in an accumulator, wherein the summation corresponds to a final result of a multiplication operation of the first original floating point number and the second original floating point number.

18. The method of claim 17, further comprising executing a matrix multiplication operation that is to include an addition of the plurality of values together to generate a final output.

19. The method of claim 18, wherein the accumulator is a second accumulator,
wherein the method further comprises:
storing a summation of the plurality of values in a first accumulator; and
storing the final output in the second accumulator.

20. The method of claim 19, further comprising:
storing a first value in the first accumulator, wherein the first value is a summation of only a subset of the plurality of values; and
adding the first value, that is stored in the first accumulator, to a second value stored in the second accumulator to generate the final output.

21. The method of claim 17, further comprising:
generating one or more of the first segmented floating point numbers to have a first total number of bits that are different than a second total number of bits of the first original floating point number; and generating one or more of the second segmented floating point numbers to have a third total number of bits that are different than a fourth total number of bits of the second original floating point number.

* * * * *